(12) United States Patent
Li (10) Patent No.: US 10,151,392 B2
(45) Date of Patent: Dec. 11, 2018

(54) VEHICLE

(71) Applicant: GM GLOBAL TECHNOLOGY OPERATIONS LLC, Detroit, MI (US)

(72) Inventor: Dongxu Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 15/353,768

(22) Filed: Nov. 17, 2016

(65) Prior Publication Data

US 2018/0135752 A1    May 17, 2018

(51) Int. Cl.
*F16H 63/34* (2006.01)
*F16H 3/66* (2006.01)

(52) U.S. Cl.
CPC ........... *F16H 63/3425* (2013.01); *F16H 3/66* (2013.01); *F16H 63/3483* (2013.01)

(58) Field of Classification Search
CPC ..... F16H 63/3425; F16H 3/66; F16H 63/3483
See application file for complete search history.

(56) References Cited

U.S. PATENT DOCUMENTS

2014/0231213 A1* 8/2014 Isomura .................. B60T 1/005
                                              192/219.5
2015/0267811 A1* 9/2015 Kristofcsak ......... F16H 63/3433
                                              192/219.5

* cited by examiner

*Primary Examiner* — Ramya P Burgess
*Assistant Examiner* — Lillian T Nguyen
(74) *Attorney, Agent, or Firm* — Quinn IP Law (57) ABSTRACT

A vehicle including a transmission and an electronic transmission range selector system in communication with the transmission to shift the transmission to one of a park operating position and an out-of-park operating position. A clutch is movable between an engaged position grounding a portion of a planetary gear set to a transmission casing to operate the gear set in a first gear and a disengaged position. A first pawl is movable between a first position to mechanically couple the first pawl to the portion of the planetary gear set when the clutch is in the disengaged position such that the first pawl operates the gear set in the first gear, and a second position to mechanically decouple the first pawl from the portion of the gear set when the clutch is in the engaged position such that the clutch operates the planetary gear set in the first gear.

20 Claims, 3 Drawing Sheets

VEHICLE

INTRODUCTION

A conventional automatic vehicle transmission includes a shift lever positioned in a vehicle interior in easy reach of a driver of the vehicle. Movement of the shift lever enables the driver to manually select a desired transmission operating range, usually from park, reverse, neutral, drive and first gear/low. This lever, which can be referred to as a PRNDL lever in the art, is mechanically coupled to a shift valve of the transmission by a length of cable. Tension on the cable during actuation of the shift lever moves the shift valve to thereby enable the selected operating range.

An electronic transmission range selector (ETRS) system can be used as an alternative to a mechanically-actuated PRNDL lever. An ETRS system utilizes electronic signals, either to the shift valve or to flow/pressure control solenoids depending on the design, instead of utilizing the cable of the conventional automatic vehicle transmission.

Transmission park systems typically engage a park gear using a park pawl. The park gear is connected to a transmission output member. Thus, whenever the driver shifts the transmission into park, the park pawl is moved into a park operating position and teeth or splines of the park pawl engage mating teeth or splines of the park gear to prevent rotation of the output member. When the driver shifts the transmission out of park, the park pawl is pulled out of the park operating position and the teeth or splines of the park pawl disengage from the mating teeth or splines of the park gear to enable rotation of the output member.

SUMMARY

The present disclosure provides a vehicle including a transmission and an electronic transmission range selector system in communication with the transmission to shift the transmission to one of a park operating position and an out-of-park operating position. The transmission includes a transmission casing and a planetary gear set disposed inside the transmission casing. Furthermore, the transmission includes a clutch movable between an engaged position grounding a portion of the planetary gear set to the transmission casing to operate the planetary gear set in a first gear and a disengaged position allowing the portion of the planetary gear set to move relative to the transmission casing. The transmission also includes a first pawl movable between a first position and a second position. The first pawl is in the first position to mechanically couple the first pawl to the portion of the planetary gear set when the clutch is in the disengaged position and the transmission is in the out-of-park operating position such that the first pawl operates the planetary gear set in the first gear. The first pawl is in the second position to mechanically decouple the first pawl from the portion of the planetary gear set when the clutch is in the engaged position and the transmission is in the out-of-park operating position such that the clutch operates the planetary gear set in the first gear.

The present disclosure also provides another vehicle including an engine and the transmission (discussed in the paragraph immediately above) coupled to the engine to receive torque outputted from the engine.

The detailed description and the drawings or FIGS. are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 4 is a schematic illustration of part of the ETRS system and the transmission being in a park operating position.

FIG. 5 is a schematic illustration of part of the ETRS system and the transmission being in a neutral operating position or a drive operating position with an engine of the vehicle on.

FIG. 6 is a schematic illustration of part of the ETRS system and the transmission being in the drive operating position with the transmission in a first gear and the engine off.

DETAILED DESCRIPTION

Those having ordinary skill in the art will recognize that all directional references (e.g., above, below, upward, up, downward, down, top, bottom, left, right, vertical, horizontal, etc.) are used descriptively for the FIGS. to aid the reader's understanding, and do not represent limitations (for example, to the position, orientation, or use, etc.) on the scope of the disclosure, as defined by the appended claims.

Figure 1:
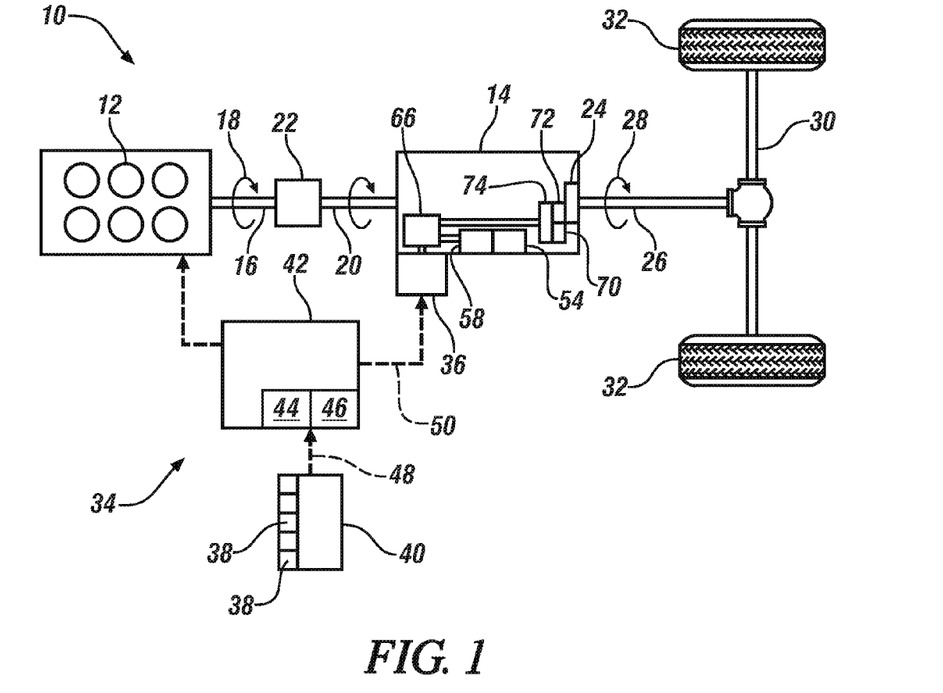
FIG. 1 is a schematic illustration of a vehicle including an electronic transmission range selector (ETRS) system and a transmission.

Referring to the FIGS., wherein like numerals indicate like or corresponding parts throughout the several views, a vehicle 10 is generally shown in FIG. 1. Non-limiting examples of the vehicle 10 can include cars, trucks, all-terrain vehicles, off-road vehicles, recreational vehicles, aircrafts, boats, watercrafts, farm equipment or any other suitable movable platform.

Continuing with FIG. 1, the vehicle 10 can include an engine 12 and a transmission 14 coupled to the engine 12. Generally, the transmission 14 is coupled to the engine 12 to receive torque outputted from the engine 12. The engine 12 can be an internal combustion engine or any other suitable type of engine. The engine 12 can include an output shaft 16 that rotates at an engine speed 18 (see arrow 18) and the transmission 14 can include an input member 20. The vehicle 10 can include a torque converter 22 that is connected to the output shaft 16 and to the input member 20 of the transmission 14. The torque converter 22 provides the desired multiplication of torque from the engine 12 into the transmission 14 at low speeds. In other embodiments, the vehicle 10 can use a clutch or clutch and damper assembly instead of the torque converter 22. Likewise, the powertrain of the vehicle 10 can include one or more electric traction motors in an optional hybrid embodiment to provide additional sources of input torque.

Again continuing with FIG. 1, the transmission 14 can include a final drive 24 surrounding the input member 20 and an output member 26 that delivers output torque 28 (see arrow 28) to one or more drive axles 30 through the final drive 24, and ultimately to a set of wheels 32. Therefore, torque from the engine 12 is transferred to the transmission 14 and the transmission 14 outputs torque to drive the wheels 32. Generally, the transmission 14 can be an automatic transmission. Therefore, the transmission 14 can automatically shift between gears as the vehicle 10 accelerates or decelerates, which will be discussed further below. It is to be appreciated that the final drive 24 can be driven by an endless rotatable member, and non-limiting examples of the endless rotatable member can include a belt or a chain.

Continuing with FIG. 1, the vehicle 10 can also include an electronic transmission range selector (ETRS) system 34 in communication with the transmission 14 to shift the transmission 14 to one of a park operating position and an out-of-park operating position. More specifically, the ETRS system 34 is operable for commanding a range shift of the transmission 14, electronically/by-wire, into a desired operating range. Such a range typically includes park, reverse, neutral, drive, and first gear/low, i.e., the conventional PRNDL range. Hence, the park operating position can refer to the "P" operating range and the out-of-park operating position can refer to any of the operating ranges other than the park operating position. Therefore, as non-limiting examples, the out-of-park operating position can include a drive operating position which can refer to the "D" operating range, a reverse operating position (referred to as the "R" operating range), a neutral operating position (referred to as the "N" operating range) and any other suitable operating positions. The other operating positions can include, as non-limiting examples, a first gear/low operating position (referred to as the "L" operating range), a sport operating position, etc. As will be discussed further below, the ETRS system 34 is in electrical communication with the transmission 14.

Again continuing with FIG. 1, the ETRS system 34 can include a shift valve 36 coupled to the transmission 14 and a plurality of push-buttons 38 in communication with the shift valve 36. Specifically, the ETRS system 34 can include an electronic range selector apparatus 40 that supports the push-buttons 38. Each push-button 38 corresponds to a desired operating range of the transmission 14, e.g., separate push-buttons 38 for park (P), reverse (R), neutral (N), drive (D), and 1$^{st}$gear/low (L). The terms "push-buttons" or "push-button" apply herein to any suitable by-wire actuated input, whether embodied as spring-biased buttons, as icons displayed on a touch-sensitive electronic display, or otherwise.

Therefore, when the desired push-button 38 is selected, the selection is communicated to the shift valve 36, and the shift valve 36 accordingly communications to the transmission 14 to switch to the desired operating range, i.e., PRNDL. More specifically, the ETRS system 34 can include a controller 42 (see FIG. 1) in communication with the push-buttons 38 and the shift valve 36. The controller 42 is configured, i.e., equipped in hardware and programmed in software, to execute instructions to control the shift valve 36 and thus the operating position of the transmission 14. As such, the controller 42 is in electrical communication with the push-buttons 38 and the shift valve 36.

Instructions can be stored in a memory 44 of the controller 42 and automatically executed via a processor 46 of the controller 42 to provide the respective control functionality. The controller 42 is configured to execute the instructions from the memory 44, via the processor 46. For example, the controller 42 can be a host machine or distributed system, e.g., a computer such as a digital computer or microcomputer, and/or as a proportional-integral-derivative (PID) controller device having the processor 46, and, as the memory 44, tangible, non-transitory computer-readable memory such as read-only memory (ROM) or flash memory. The controller 42 can also have random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry. Therefore, the controller 42 can include all software, hardware, memory 44, algorithms, connections, sensors, etc., necessary to control the shift valve 36 and the push-buttons 38. As such, a control method operative to control the shift valve 36 and the push-buttons 38, can be embodied as software or firmware associated with the controller 42. It is to be appreciated that the controller 42 can also include any device capable of analyzing data from various sensors, comparing data, making the necessary decisions required to control and monitor the shift valve 36 and the push-buttons 38. Furthermore, the controller 42 can be in communication with the engine 12 as discussed further below. Optionally, more than one controller 42 can be utilized.

As suggested above, the electronic range selector apparatus 40, and thus the push-buttons 38, are not mechanically connected to the shift valve 36. Instead, depression of one of the push-buttons 38 causes transmission of a range selection signal 48 (see arrow 48) to the controller 42, which receives the transmitted range selection signal 48 (see arrow 48) and commands a shift of the transmission 14 to the corresponding operating range. The operating range is commanded via transmission of shift control signals 50 (see arrow 50) to the shift valve 36, or to one or more solenoids or other flow or pressure control valves cooperating with the transmission 14 depending on the embodiment. Therefore, electronic signals are utilized to communicate the desired operating range to the transmission 14. It is to be appreciated that the shift valve 36 can include one or more valves and/or one or more solenoids, one or more of which can be disposed inside of the transmission 14 and/or mounted externally to the transmission 14.

When the transmission 14 is in the out-of-park operating position, and specifically in drive (D), the transmission 14 can automatically shift between gears as the vehicle 10 accelerates or decelerates. Therefore, for example, if the transmission 14 is a six-speed transmission 14, the transmission 14 can shift between six gears, e.g., first gear, second gear, third gear, fourth gear, fifth gear and sixth gear. It is to be appreciated that the transmission 14 can be any suitable speed transmission, and additional non-limiting examples of the transmission 14 can include a four-speed transmission and a nine-speed transmission.

Generally, when the engine 12 is turned on while in park (P), the operating position of the transmission 14 can be switched to the out-of-park operating position, which can allow movement of the vehicle 10 in a forward direction or a rearward direction. The vehicle 10 can be designed such that the engine 12 can turn off when stopped, for example, at a traffic light, while the transmission 14 remains in the drive operating position, e.g., drive (D). This condition, i.e., the engine 12 is off at a stop while the transmission 14 is in the drive operating position, can be referred to as an auto stop.

When it is desired to move the vehicle 10 forward from the auto stop, releasing of the brake and/or pressing the accelerator can cause the engine 12 to turn on, and thus, transfer torque to the transmission 14 and then to the wheels 32 to move the vehicle 10 forward. This condition, i.e., the engine 12 turns on at the stop while the transmission 14 is in the drive operating position, e.g., drive (D), can be referred to as an auto start. When the engine 12 is in the auto stop or auto start, the transmission 14 is in the first gear regardless of which speed transmission, e.g., four-speed, six-speed, nine-speed, etc., is being utilized.

Figure 2:
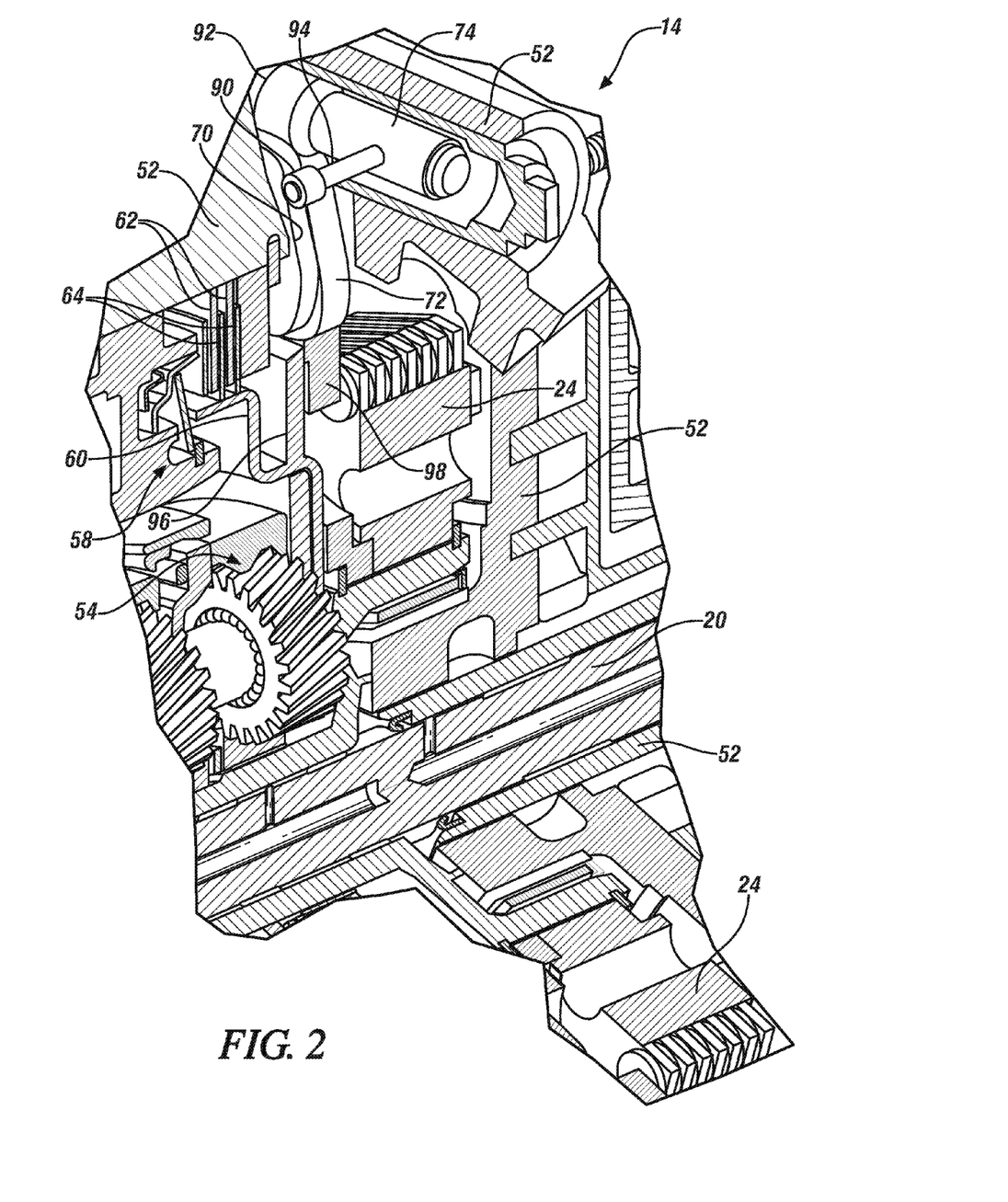
FIG. 2 is a schematic fragmentary cross-sectional view of the transmission.
Figure 3:
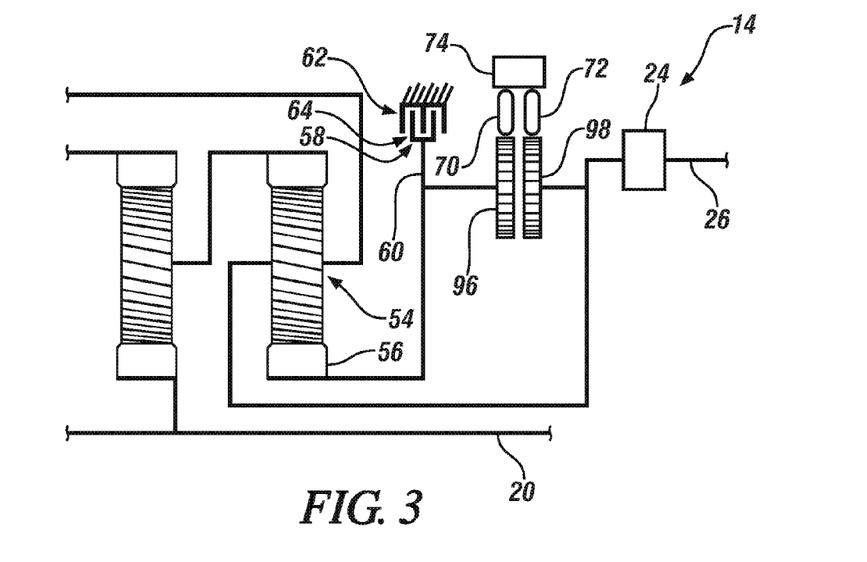
FIG. 3 is a schematic illustration of a portion of the transmission.

Referring to FIGS. 1 and 2, the transmission 14 includes a transmission casing 52 and a planetary gear set 54 disposed inside the transmission casing 52. Generally, at least part of the input member 20 is disposed inside the transmission casing 52. Furthermore, the planetary gear set 54 can surround the input member 20. The planetary gear set 54 can operate to shift the transmission 14 to a desired gear. Therefore, for example, when the transmission 14 is in the out-of-park operating position and the vehicle 10 is stopped, the planetary gear set 54 can operate in the first gear, i.e., the transmission 14 is in the first gear. It is to be appreciated that the transmission 14 can include a plurality of planetary gear sets 54 (two are shown in FIG. 3 for illustrative purposes only) to operate the transmission 14 in various gears. It is to be appreciated that the planetary gear set 54 can include a ring gear 56 (see FIG. 3), a sun gear and a plurality of pinion gears supported by a carrier. The carrier rotatably supports the pinion gears, with the pinion gears meshing with the sun gear and the ring gear 56. Generally, the ring gear 56, the sun gear the pinion gears and the carrier are each capable of rotation.

Referring to FIGS. 2 and 3, the transmission 14 also includes a clutch 58 movable between an engaged position grounding a portion of the planetary gear set 54 to the transmission casing 52 to operate the planetary gear set 54 in the first gear and a disengaged position allowing the portion of the planetary gear set 54 to move relative to the transmission casing 52. In certain embodiments, the clutch 58 can include a hub 60 fixed to the portion of the planetary gear set 54, a first set of plates 62 supported by the hub 60 and a second set of plates 64 supported by the transmission casing 52. Generally, the first and second sets of plates 62, 64 can be disposed in an alternating pattern. The first and second plates 62, 64 can engage each other to ground the portion of the planetary gear set 54 to the transmission casing 52 when the clutch 58 is in the engaged position. Therefore, the portion of the planetary gear set 54 is not rotatable when grounded to the transmission casing 52. Furthermore, the first and second plates 62, 64 can disengage each other when the clutch 58 is in the disengaged position; thus the portion of the planetary gear set 54 is no longer grounded to the transmission casing 52. As such, the portion of the planetary gear set 54 is capable of rotation when no longer grounded to the transmission casing 52. In certain embodiments, the portion of the planetary gear set 54 that is grounded to the transmission casing 52 when in the first gear can be the ring gear 56.

Referring to FIG. 1, the transmission 14 can further include a hydraulic apparatus 66. The hydraulic apparatus 66 can include one or more tubes 68 in which hydraulic fluid can flow through. The hydraulic apparatus 66 can further include a pump to pump the hydraulic fluid and a reservoir to store excess hydraulic fluid.

The hydraulic apparatus 66 can be in fluid communication with the clutch 58 and the shift valve 36. The clutch 58 is hydraulically operated by the hydraulic apparatus 66. Therefore, when the clutch 58 is to be operated in the engaged position, the hydraulic apparatus 66 pumps hydraulic fluid through various tubes 68 to build hydraulic pressure which causes the first and second sets of plates 62, 64 to clamp together (i.e., engage each other) which grounds the hub 60 of the clutch 58 and the portion of the planetary gear set 54 to the transmission casing 52. It is to be appreciated that the hydraulic apparatus 66 can be in fluid communication with other components as well.

Generally, the clutch 58 is in the engaged position when the planetary gear set 54 is to operate in the first gear, i.e., when the transmission 14 is in the first gear. As such, hydraulic pressure maintains the first and second sets of plates 62, 64 in engagement with each other in the first gear when the engine 12 is on. Power to operate the shift valve 36 is high when the engine is on and the clutch 58 is operating in the engaged position. However, when the engine 12 turns off during the auto stop, the power to operate the shift valve 36 is low and hydraulic pressure can decrease which causes the clutch 58 to move from the engaged position to the disengaged position. When this pressure decrease occurs, the planetary gear set 54 is no longer operating in the first gear by the clutch 58. Therefore, the transmission 14 further includes a first pawl 70 (best shown in FIGS. 2-6) which grounds the portion of the planetary gear set 54 to the transmission casing 52 when hydraulic pressure decreases in the clutch 58 such that the planetary gear set 54 remains in the first gear during the auto stop.

The first pawl 70 is movable between a first position and a second position. The first pawl 70 is in the first position to mechanically couple the first pawl 70 to the portion of the planetary gear set 54 when the clutch 58 is in the disengaged position and the transmission 14 is in the out-of-park operating position such that the first pawl 70 operates the planetary gear set 54 in the first gear. The first pawl 70 is in the second position to mechanically decouple the first pawl 70 from the portion of the planetary gear set 54 when the clutch 58 is in the engaged position and the transmission 14 is in the out-of-park operating position such that the clutch 58 operates the planetary gear set 54 in the first gear. Therefore, once hydraulic pressure builds up to a suitable level during the auto start (when in the drive operating position), the first pawl 70 moves from the first position back to the second position such that the clutch 58 takes over grounding the portion of the planetary gear set 54 to the transmission casing 52 when in the first gear. The first position of the first pawl 70 is best illustrated in FIG. 6, and the second position of the first pawl 70 is best illustrated in FIGS. 4 and 5.

Figures 4, 5, 6:
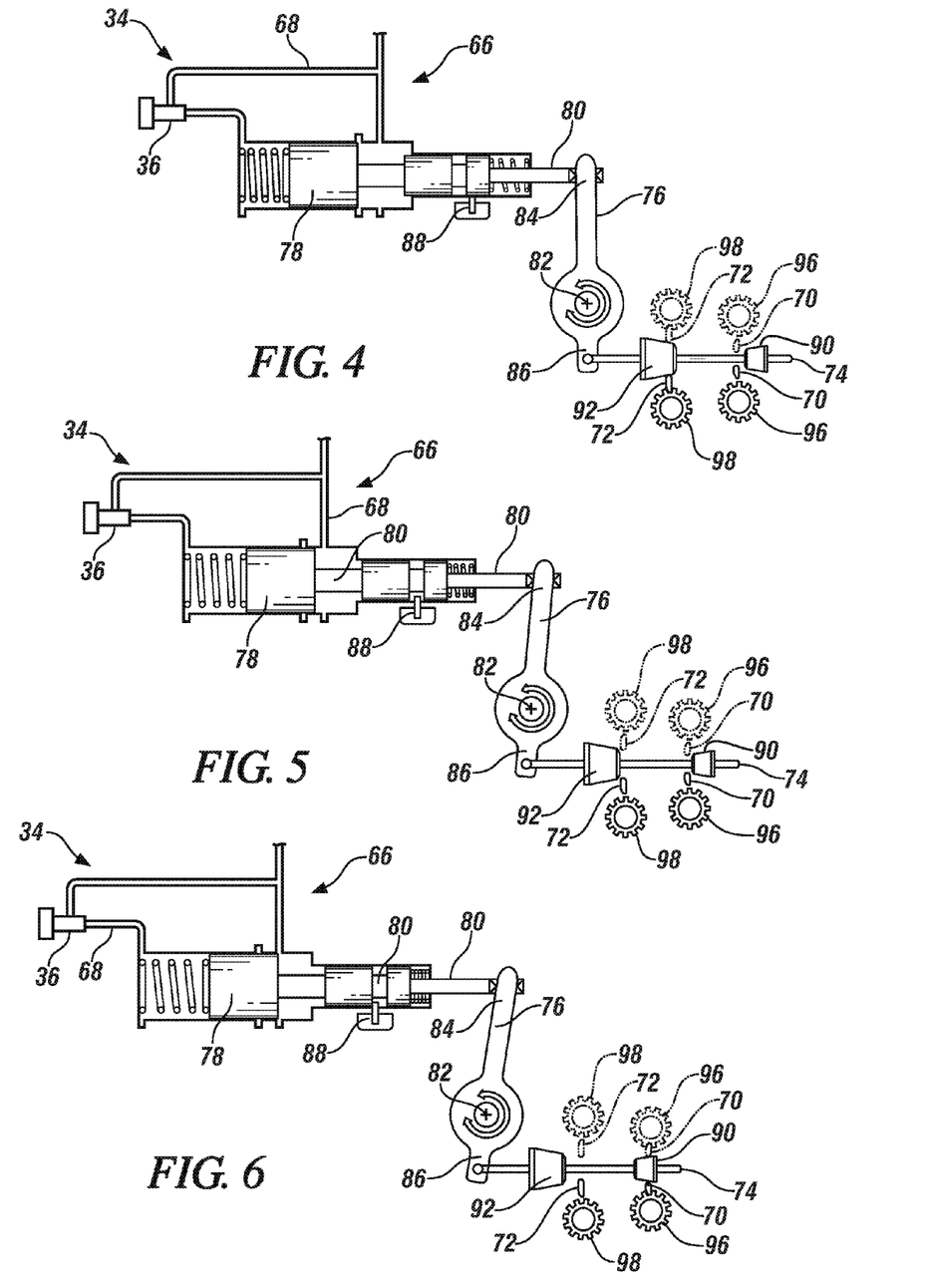

As best shown in FIGS. 4-6, the transmission 14 can also include a second pawl 72 movable between a first position and a second position. The first position of the second pawl 72 corresponds to when the transmission 14 is in the park operating position. The second position of the second pawl 72 corresponds to when the transmission 14 is in the out-of-park operating position. Generally, when the second pawl 72 is in the first position and the transmission 14 is in the park operating position, the second pawl 72 is connected to the output member 26 of the transmission 14 to prevent rotation of the output member 26. Therefore, the second pawl 72 prevents the vehicle 10 from moving when in the first position. As such, the second pawl 72 can be referred to as a park pawl. When the second pawl 72 is in the first position, e.g., the vehicle 10 is parked, the first pawl 70 is in the second position (see FIG. 4). The first position of the second pawl 72 is best illustrated in FIG. 4, and the second position of the second pawl 72 is best illustrated in FIGS. 5 and 6.

In certain situations, the second pawl 72 is in the second position when the first pawl 70 is in the first position (see FIG. 6). Therefore, in FIG. 6, when the transmission 14 is in the out-of-park operating position, and specifically in drive (D), and the engine 12 is off, e.g., auto off, the transmission 14 is in the first gear through operation of the first pawl 70 being in the first position. As such, when the first pawl 70 is in the first position, the hub 60 of the clutch 58 is grounded to the transmission casing 52 which grounds the portion of the planetary gear set 54 to the transmission casing 52.

Furthermore, when the transmission 14 is in the neutral operating position and the engine 12 is on, the first pawl 70 is in the second position and the second pawl 72 is in the second position (see FIG. 5). Additionally, when the transmission 14 is in the out-of-park operating position, and specifically in drive (D), and the engine 12 is on but no longer performing an auto stop/start, the first pawl 70 is in the second position and the second pawl 72 is in the second position (see FIG. 5).

Referring to FIGS. 4-6, the transmission 14 can also include a selector rod 74 movable relative to the first pawl 70. More specifically, the selector rod 74 can be movable relative to the first and second pawls 70, 72. In certain embodiments, the first and second pawls 70, 72 can be disposed between the selector rod 74 and the input member 20 (see FIGS. 2 and 3). Movement of the selector rod 74 causes the first pawl 70 to move to at least one of the first and second positions of the first pawl 70, and the second pawl 72 to move to at least one of the first and second positions of the second pawl 72. A reduction in hydraulic pressure causes the clutch 58 to move from the engaged position to the disengaged position during, for example, the auto stop, and the reduction in hydraulic pressure causes the first pawl 70 to operate in the first position to maintain the planetary gear set 54 in the first gear until hydraulic pressure increases to cause the clutch 58 to move from the disengaged position back to the engaged position.

As best shown in FIGS. 4-6, the selector rod 74 is hydraulically operated. The increase in hydraulic pressure that causes the clutch 58 to move from the disengaged position back to the engaged position also causes the selector rod 74 to move thereby allowing the first pawl 70 to move from the first position to the second position. As such, the hydraulic apparatus 66 is also in fluid communication with the selector rod 74. Therefore, when the engine 12 is off in the auto stop, a reduction in hydraulic pressure causes the selector rod 74 to move such that the first pawl 70 moves to the first position; and when the engine 12 turns back on in the auto start, once the hydraulic pressure builds up to a suitable level, the selector rod 74 moves such that the first pawl 70 returns to the second position.

The transmission 14 can also include a lever 76 and the hydraulic apparatus 66 can further include a valve body 78 and a valve arm 80 extending from the valve body 78. The lever 76 can be rotatable coupled to the valve arm 80. As such, linear movement of the valve arm 80 causes the lever 76 to rotate. Hydraulic fluid can enter either sides of the valve body 78 which causes the valve arm 80 to move correspondingly, and thus, the lever 76 correspondingly moves. Movement of the lever 76 causes the selector rod 74 to correspondingly move.

The lever 76 can rotate relative to a pivot point 82, and the lever 76 can include a first end 84 and a second end 86 opposing each other on opposite sides of the pivot point 82. Therefore, one of the valve arm 80 and the selector rod 74 is attached to one of the first and second ends 84, 86, and the other one of the valve arm 80 and the selector rod 74 is attached to the other one of the first and second ends 84, 86. In certain embodiments, the valve arm 80 can be attached to the first end 84 of the lever 76 and the selector rod 74 can be attached to the second end 86 of the lever 76. In other embodiments, the valve arm 80 can be attached to the second end 86 of the lever 76 and the selector rod 74 can be attached to the first end 84 of the lever 76.

The lever 76 can rotate clockwise and counterclockwise relative to the pivot point 82. Furthermore, the valve body 78 can be biasable (non-limiting examples can include spring, lever, motor actuated, solenoid actuated, electronic actuated, etc.) to return the valve body 78 to a desired position depending on the hydraulic pressure. Additionally, the lever 76 can be biasable (non-limiting examples can include spring, lever, motor actuated, solenoid actuated, electronic actuated, etc.) to return the lever 76 to a desired position depending on the hydraulic pressure.

The hydraulic apparatus 66 can include a finger 88 movable between a first position (see FIG. 4) and a second position (see FIGS. 5 and 6). Referring to FIG. 4, the finger 88 is in the first position when the transmission 14 is in the park operating position and the second pawl 72 is in the first position, e.g., the vehicle 10 is parked. When the finger 88 is in the first position, the finger 88 does not prevent movement of the valve body 78 and the valve arm 80. Referring to FIGS. 5 and 6, the finger 88 is in the second position when the transmission 14 is in the out-of-park position, and for example, is in the neutral operating position or the drive operating position, which restricts movement of the valve body 78 and the valve arm 80 to prevent the transmission 14 from entering the park operating position at an undesirable time. The finger 88 can be biasable (non-limiting examples can include spring, lever, motor actuated, solenoid actuated, electronic actuated, etc.).

As best shown in FIGS. 2 and 4-6, the selector rod 74 can include a first cam 90 and a second cam 92 spaced from each other. The first cam 90 can engage the first pawl 70 to move the first pawl 70 to at least one of the first and second positions. Additionally, the second cam 92 can engage the second pawl 72 to move the second pawl 72 to at least one of the first and second positions. The first and second cams 90, 92 can be any suitable configuration, and for example, can be tapered, eccentric, arcuate, curved, sloped, circular, etc.

Generally, the first and second pawls 70, 72 are movable independently of each other between respective first and second positions. Therefore, one of the pawls 70, 72 can be in one position, i.e., the first or second positions, while the other one of the pawls 70, 72 can be in another position, i.e., the first or second positions. In certain embodiments, the first and second pawls 70, 72 are juxtaposed to each other (see for example FIG. 2). It is to be appreciated that the first and second pawls 70, 72 can be on opposite sides of the selector rod 74, both of the pawls 70, 72 can be over the top of the selector rod 74 (shown in phantom lines in FIGS. 4-6), both of the pawls 70, 72 can be below the selector rod 74 (shown in solid lines in FIGS. 4-6) or any other suitable location.

Additionally, the first and second pawls 70, 72 can be biasable (non-limiting examples can include spring, lever, motor actuated, solenoid actuated, electronic actuated, etc.) to return to one of the respective first and second positions. For example, when the first cam 90 is spaced from the first pawl 70, the first pawl 70 can bias back to the second position, and when the second cam 92 is spaced from the second pawl 72, the second pawl 72 can bias back to the second position. Alternatively, the selector rod 74 can move the first and second pawls 70, 72 to both of the respective first and second positions. Therefore, when referring to the selector rod 74 causing the first pawl 70 to move to at least one of the first and second positions of the first pawl 70, this can include situations where the selector rod 74 can move the first pawl 70 to both positions or when the selector rod 74 can move the first pawl 70 to one of the positions, i.e., the first position or the second position. Similarly, when referring to the selector rod 74 causing the second pawl 72 to move to at least one of the first and second positions of the second pawl 72, this can include situations where the selector rod 74 can move the second pawl 72 to both positions or when the selector rod 74 can move the second pawl 72 to one of the positions, i.e., the first position or the second position.

Furthermore, the selector rod 74 can be any suitable configuration. One non-limiting example, the selector rod 74 can include an arm 94 (see FIG. 2) extending outwardly therefrom, with the first cam 90 disposed on the arm 94. As other non-limiting examples, the selector rod 74 can be elongated, Y-shaped, or the thickness of the rod increased to be able to overlap both the first and second pawls 70, 72, such that the selector rod 74 can position the first and second cams 90, 92 over the respective first and second pawls 70, 72 in certain positions. As yet another non-limiting example, the selector rod 74 can be formed of two separate pieces, each movable independently of each other, with one of the selector rod pieces utilized for the first pawl 70 and another one of the selector rod pieces utilized for the second pawl 72.

Referring to FIGS. 2 and 3, the transmission 14 can also include a first locking gear 96 fixed to a portion of the clutch 58. More specifically, the first locking gear 96 can be fixed to the hub 60 of the clutch 58. Therefore, the portion of the clutch 58 can include the hub 60. In certain embodiments, the first locking gear 96 can be disposed between the input member 20 and the first pawl 70. The first pawl 70 can engage the first locking gear 96 to mechanically couple the first pawl 70 and the hub 60 together such that the first pawl 70 operates the planetary gear set 54 in the first gear when the first pawl 70 is in the first position and the clutch 58 is in the disengaged position. More specifically, the first pawl 70 engages the first locking gear 96 to mechanically couple the first pawl 70 and the hub 60 together to ground the portion of the planetary gear set 54 to the transmission casing 52 through the hub 60 such that the planetary gear set 54 operates in the first gear when the first pawl 70 is in the first position and the clutch 58 is in the disengaged position. Engagement between the first pawl 70 and the first locking gear 96 occurs when the first pawl 70 is in the first position (see FIG. 6). As such, the first and second sets of plates 62, 64 of the clutch 58 do not engage each other, e.g., do not ground the portion of the planetary gear set 54 to the transmission casing 52, when the first pawl 70 engages the first locking gear 96. The first locking gear 96 can include teeth, splines, etc., such that the first pawl 70 is disposed between a pair of teeth or a pair of splines, etc., when the first pawl 70 is in the first position.

Continuing with FIGS. 2 and 3, the transmission 14 can also include a second locking gear 98 fixed to the final drive 24. In certain embodiments, the second locking gear 98 can be disposed between the input member 20 and the second pawl 72. The second pawl 72 can engage the second locking gear 98 to prevent movement of the second locking gear 98 and the final drive 24 when the second pawl 72 is in the first position and the transmission 14 is in the park operating position. Therefore, engagement of the second pawl 72 with the second locking gear 98 prevents movement of the vehicle 10, e.g., the vehicle 10 is parked. Engagement between the second pawl 72 and the second locking gear 98 occurs when the second pawl 72 is in the first position (see FIG. 4). The second locking gear 98 can include teeth, splines, etc., such that the second pawl 72 is disposed between a pair of teeth or a pair of splines, etc., when the second pawl 72 is in the first position.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
a transmission including a transmission casing;
an electronic transmission range selector system in communication with the transmission to shift the transmission to one of a park operating position and an out-of-park operating position;
wherein the transmission further includes:
a planetary gear set disposed inside the transmission casing;
a clutch movable between an engaged position grounding a portion of the planetary gear set to the transmission casing to operate the planetary gear set in a first gear and a disengaged position allowing the portion of the planetary gear set to move relative to the transmission casing; and
a first pawl movable between a first position and a second position, wherein the first pawl is in the first position to mechanically couple the first pawl to the portion of the planetary gear set when the clutch is in the disengaged position and the transmission is in the out-of-park operating position such that the first pawl operates the planetary gear set in the first gear, and wherein the first pawl is in the second position to mechanically decouple the first pawl from the portion of the planetary gear set when the clutch is in the engaged position and the transmission is in the out-of-park operating position such that the clutch operates the planetary gear set in the first gear.

2. The vehicle as set forth in claim 1 wherein the transmission includes a second pawl movable between a first position and a second position, with the first position of the second pawl corresponding to when the transmission is in the park operating position and the second position of the second pawl corresponding to when the transmission is in the out-of-park operating position.

3. The vehicle as set forth in claim 2 wherein the transmission includes a selector rod movable relative to the first and second pawls, wherein movement of the selector rod causes the first pawl to move to at least one of the first and second positions of the first pawl, and the second pawl to move to at least one of the first and second positions of the second pawl.

4. The vehicle as set forth in claim 3 wherein the selector rod includes a first cam and a second cam spaced from each other, with the first cam engaging the first pawl to move the first pawl to at least one of the first and second positions, and with the second cam engaging the second pawl to move the second pawl to at least one of the first and second positions.

5. The vehicle as set forth in claim 3 wherein the transmission includes an input member disposed inside the transmission casing, and wherein the first and second pawls are disposed between the selector rod and the input member.

6. The vehicle as set forth in claim 2 wherein the second pawl is in the second position when the first pawl is in the first position.

7. The vehicle as set forth in claim 2 wherein the first and second pawls are movable independently of each other between respective first and second positions.

8. The vehicle as set forth in claim 2 wherein the first and second pawls are juxtaposed to each other.

9. The vehicle as set forth in claim 8 wherein:
the transmission includes an input member disposed inside the transmission casing;
the transmission includes a final drive surrounding the input member;
the transmission includes a first locking gear fixed to a portion of the clutch;
the transmission includes a second locking gear fixed to the final drive; and
wherein the first locking gear is disposed between the input member and the first pawl, and the second locking gear is disposed between the input member and the second pawl.

10. The vehicle as set forth in claim 1 wherein:
the clutch includes a hub fixed to the portion of the planetary gear set;
the transmission includes a first locking gear fixed to the hub; and
the first pawl engages the first locking gear to mechanically couple the first pawl and the hub together such that the first pawl operates the planetary gear set in the first gear when the first pawl is in the first position and the clutch is in the disengaged position.

11. The vehicle as set forth in claim 10 wherein:
the transmission includes a final drive;
the transmission includes a second pawl movable between a first position and a second position, with the first position of the second pawl corresponding to when the transmission is in the park operating position and the second position of the second pawl corresponding to when the transmission is in the out-of-park operating position;
the transmission includes a second locking gear fixed to the final drive; and
the second pawl engages the second locking gear to prevent movement of the second locking gear and the final drive when the second pawl is in the first position and the transmission is in the park operating position.

12. The vehicle as set forth in claim 1 wherein:
the transmission includes a hydraulic apparatus;
the clutch is hydraulically operated by the hydraulic apparatus; and
wherein a reduction in hydraulic pressure causes the clutch to move from the engaged position to the disengaged position, and the reduction in hydraulic pressure causes the first pawl to operate in the first position to maintain the planetary gear set in the first gear until hydraulic pressure increases to cause the clutch to move from the disengaged position back to the engaged position.

13. The vehicle as set forth in claim 12 wherein:
the transmission includes a selector rod movable relative to the first pawl;
movement of the selector rod causes the first pawl to move to at least one of the first and second positions of the first pawl; and the increase in hydraulic pressure that causes the clutch to move from the disengaged position back to the engaged position also causes the selector rod to move thereby allowing the first pawl to move from the first position to the second position.

14. The vehicle as set forth in claim 1 wherein:
the clutch includes a hub fixed to the portion of the planetary gear set, a first set of plates supported by the hub and a second set of plates supported by the transmission casing, with the first and second sets of plates disposed in an alternating pattern;
the first and second sets of plates engage each other to ground the portion of the planetary gear set to the transmission casing when the clutch is in the engaged position;
the first and second sets of plates disengage each other when the clutch is in the disengaged position;
the transmission includes a first locking gear fixed to the hub; and
the first pawl engages the first locking gear to mechanically couple the first pawl and the hub together to ground the portion of the planetary gear set to the transmission casing through the hub such that the planetary gear set operates in the first gear when the first pawl is in the first position and the clutch is in the disengaged position.

15. A vehicle comprising:
an engine;
a transmission coupled to the engine to receive torque outputted from the engine;
an electronic transmission range selector system in communication with the transmission to shift the transmission to one of a park operating position and an out-of-park operating position;
wherein the transmission further includes:
a transmission casing;
a planetary gear set disposed inside the transmission casing;
a clutch movable between an engaged position grounding a portion of the planetary gear set to the transmission casing to operate the planetary gear set in a first gear and a disengaged position allowing the portion of the planetary gear set to move relative to the transmission casing; and
a first pawl movable between a first position and a second position, wherein the first pawl is in the first position to mechanically couple the first pawl to the portion of the planetary gear set when the clutch is in the disengaged position and the transmission is in the out-of-park operating position such that the first pawl operates the planetary gear set in the first gear, and wherein the first pawl is in the second position to mechanically decouple the first pawl from the portion of the planetary gear set when the clutch is in the engaged position and the transmission is in the out-of-park operating position such that the clutch operates the planetary gear set in the first gear.

16. The vehicle as set forth in claim 15 wherein the transmission includes a second pawl movable between a first position and a second position, with the first position of the second pawl corresponding to when the transmission is in the park operating position and the second position of the second pawl corresponding to when the transmission is in the out-of-park operating position.

17. The vehicle as set forth in claim 16 wherein the transmission includes a selector rod movable relative to the first and second pawls, wherein movement of the selector rod causes the first pawl to move to at least one of the first and second positions of the first pawl, and the second pawl to move to at least one of the first and second positions of the second pawl.

18. The vehicle as set forth in claim 17 wherein the selector rod includes a first cam and a second cam spaced from each other, with the first cam engaging the first pawl to move the first pawl to at least one of the first and second positions, and with the second cam engaging the second pawl to move the second pawl to at least one of the first and second positions.

19. The vehicle as set forth in claim 15 wherein:
the clutch includes a hub fixed to the portion of the planetary gear set;
the transmission includes a first locking gear fixed to the hub; and
the first pawl engages the first locking gear to mechanically couple the first pawl and the hub together such that the first pawl operates the planetary gear set in the first gear when the first pawl is in the first position and the clutch is in the disengaged position.

20. The vehicle as set forth in claim 15:
the transmission includes a hydraulic apparatus;
the clutch is hydraulically operated by the hydraulic apparatus; and
wherein a reduction in hydraulic pressure causes the clutch to move from the engaged position to the disengaged position, and the reduction in hydraulic pressure causes the first pawl to operate in the first position to maintain the planetary gear set in the first gear until hydraulic pressure increases to cause the clutch to move from the disengaged position back to the engaged position.

* * * * *